Patented Mar. 3, 1942

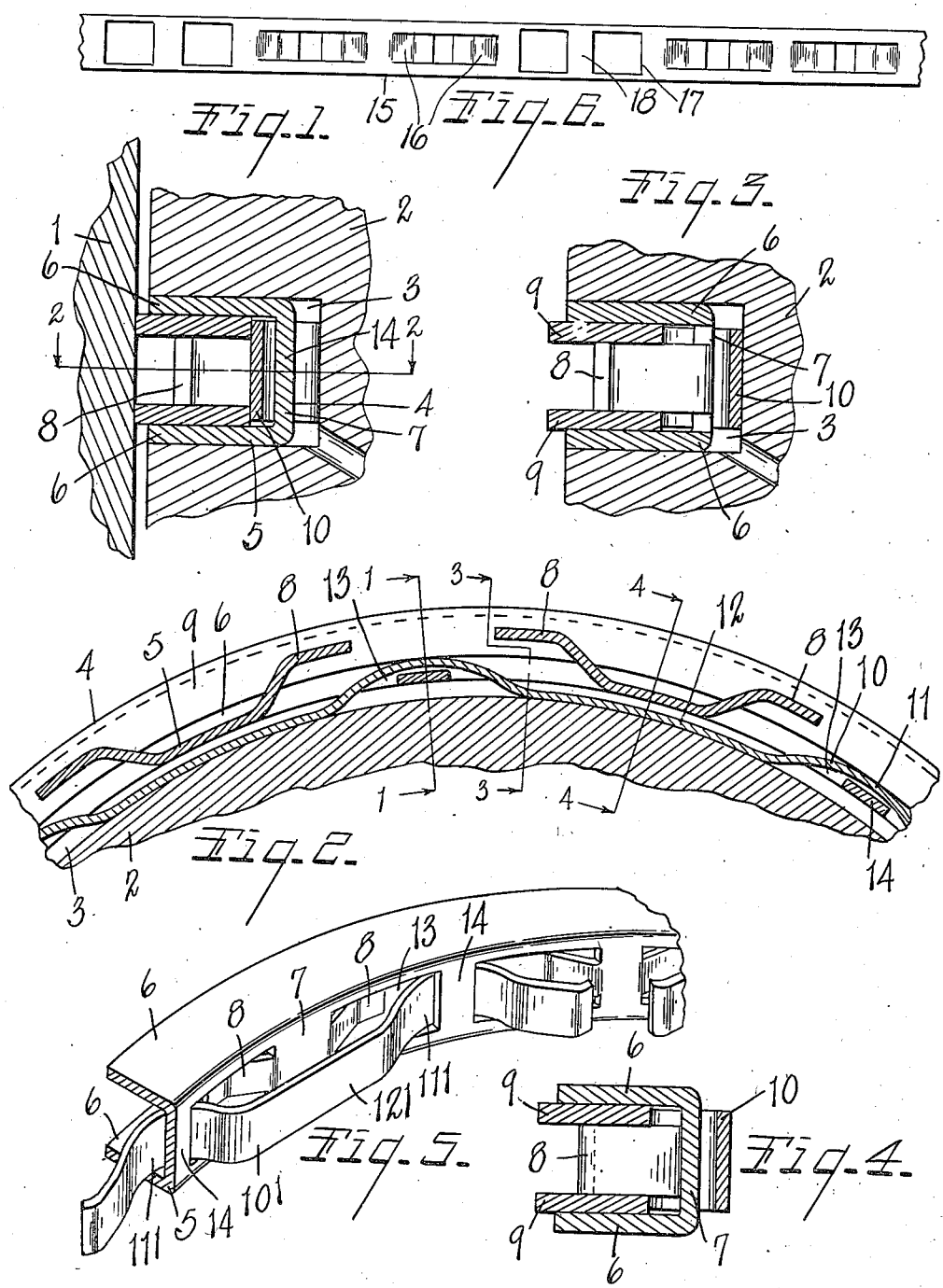

2,274,805

UNITED STATES PATENT OFFICE 2,274,805

PISTON RING ASSEMBLY

Harold P. Phillips, Hastings, Mich., assignor to Hastings Manufacturing Company, Hastings, Mich., a corporation of Michigan Application February 23, 1940, Serial No. 320,396

16 Claims. (Cl. 309—45)

The main objects of this invention are:

First, to provide a novel preassembled composite piston ring for internal combustion engines, which is characterized by its effectiveness of action and ease of installation.

Second, to provide a composite piston ring of the type described, including a plurality of elements which may be readily assembled at the factory and marketed and installed as a unit.

Third, to provide a composite ring of the type described, which is formed in its entirety of ductile metal, hence is free from the danger of breakage in handling, shipping, and installation, which has characterized hitherto known piston rings.

Fourth, to provide a composite ring of the type described, which is characterized by a plurality of cylinder wall engaging elements acting independently to assure effective engagement with a cylinder wall.

Objects relating to details and economies of the invention will appear from the description to follow. The invention is defined in the claims.

Preferred embodiments of the invention are illustrated in the accompanying drawing, wherein:

Fig. 1 is an enlarged fragmentary view in vertical section on line 1—1 of Fig. 2, illustrating a cylinder with a piston reciprocal therein provided with a composite ring assembly in accordance with my invention.

Fig. 2 is an enlarged fragmentary view in section on line 2—2 of Fig. 1, further illustrating details and relation of parts of my composite piston ring.

Figs. 3 and 4 are views in section on lines corresponding to lines 3—3 and 4—4 of Fig. 2.

Fig. 5 is an enlarged fragmentary perspective view illustrating a somewhat modified embodiment of the invention, wherein a plurality of inner expanding segments are employed.

Fig. 6 is a fragmentary view in elevation illustrating a still further embodiment of the invention as regards the body or carrier ring of the assembly.

The present invention relates in general to a composite piston ring of the type illustrated in my Patent No. 2,148,997 of February 28, 1939, and specifically to improvements in that structure whereby the component elements thereof may be readily preassembled at the factory for marketing as a unitary construction which is characterized by the ease with which it may be installed on a piston.

Referring to the drawing, the reference numeral 1 indicates a cylinder in which a piston 2 reciprocates, the latter being provided with a plurality of grooves, of which the oil ring groove 3 is illustrated, receiving the composite piston ring unit of my invention designated by the numeral 4. While I have chosen to illustrate the unit as installed in an oil ring groove, it will be apparent from the description to follow that the structure thereof is well adapted for installation in other grooves of a piston, and I therefore desire the invention to be regarded broadly in this respect.

The assembly 4 consists of an annular, split carrier or body member 5 of U or channel section. This member is preferably formed of a suitable ductile material such as steel, brass, and the like, rendering the same capable of being readily formed into its U-or channel section and also the forming of other features. The legs or flanges 6 of this member 5 are illustrated as out of contact with the cylinder wall, though if desired they may be of such radial width as to effect engagement with the latter. The web or intermediate connecting portion 7 of the member 5 has integral fingers or tongues 8 struck radially outwardly therefrom with the side edges thereof in axially spaced relation to the flanges 6. This spacing is sufficient to receive the annular split ribbon-like expansible steel cylinder wall engaging elements or segments 9 which are supportingly engaged and spaced by the tongues and maintained thereby in parallel relation to one another and in side-by-side engagement with the carrier flanges 6. These steel cylinder wall engaging elements exert radial outward thrust on the cylinder wall, producing high unit wall tension by reason of their being thin, and this radial outward thrust is augmented by a split inner ring or expander spring 10 engaging the rear or inner sides of the segments.

Referring to Fig. 2, it will be seen that the expander spring 10 is of annular construction provided with a plurality of outwardly convex crimps 11 for engagement with the segments 9 and connecting reaches 12 engageable with the bottom of the ring groove. The expander is associated with the steel segments 9 in a novel manner, being woven or rove through the openings 13 in the web 7 of the member 5 and over the portions 14 thereof between the struck-out spacer tongues so that they engage the segments 9 at points in radial alinement with the portions of the body ring from which the ends of tongues 8 are cut. This assembly of the carrier member, wall engaging segments, and expander may be readily effected at the factory by simply inserting one end of the expander in the space defined by a tongue 8 and then proceeding to reeve the same in and out in the manner illustrated in Figs. 2 and 5 with relation to the alternating parts of the carrier adjacent the tongue ends and connecting the tongues. When the expanding spring is completely inserted as described, the steel segments 9 are then snapped into the spaces between the edges of tongues 8 and the flanges 5.

In the embodiment of my invention illustrated in Fig. 5, the carrier member and its spacer tongues 8 are similar to those illustrated in Figs. 1 to 4, however, instead of forming the inner expanding means as a single annular split element, I provide a plurality of expander spring members 101 each of which has one or more crimps 111 rove through the opening in the web of the carrier member and over the portions 14 thereof, the reaches 121 bridging the space between the crimps and being engageable with the bottom of the piston groove. This construction serves to reduce the creep present in a one-piece inner ring or spring, since the creep of each flexing crimp is not transferred to all of the crimps of the spring. Individuality or independence of flexing action is also enhanced. In practice, there may be five or six of these members or spring segments or in fact any number thereof that the diameter of the groove would make room for. The threaded engagement thereof with the channeled body ring is ample to maintain the same in place and to facilitate installation.

In Fig. 6 illustrated a somewhat modified embodiment of the body member, which is designated generally by the reference numeral 15. It will be noticed that in the embodiment of Figs. 1 to 5 the spacer tongues 8 are of substantially less axial width than the openings in the body portion of the ring from which they are punched to enable the tongues to space the steel segments 9. In the embodiment of my invention illustrated in Fig. 6, the segment spacing tongues 16 are struck out from the web of the body or carrier member designated by the numeral 15 in a manner opposite to that employed in Figs. 1 to 5, that is, each pair of adjacent tongues have the extremities thereof facing one another rather than diverging from one another. The member 15 is also provided with larger openings 17 in the web thereof, which are equal in axial width to the distance corresponding to the flanges 6 and through which the expanding spring, whether in the form of a complete annular element or in the form of a plurality of segments or springs such as illustrated in Fig. 5, is inserted, being woven or rove behind the intermediate web portions 18 separating a pair of openings 17 in an obvious manner. This enables an expanding spring of practically the full axial dimension of the space between the carrier ring flanges to be employed so that the spring may engage both the upper and lower cylinder wall contacting elements 6. At the same time, the feature of punching out tongues spaced both at their top and bottom from the carrier element is eliminated. I desire it to be understood that I regard the carrier ring illustrated in Fig. 6 as the full equivalent of that illustrated in Figs. 1 to 5.

The resultant product is a factory assembled unit which may be marketed as such and readily installed in a ring groove in a fraction of the time required to install the corresponding elements separately. There is, moreover, no danger of improper assembly of parts not meant for assembly with one another, with the result that assurance is had that the manufacturer's recommendations for a given installation will be complied with.

The expanding spring or springs may be provided with suitable recesses or slots of a well known type if desired, for providing additional oil clearance. The offset tongues 8 afford oil drainage openings of ample area through the body or carrier ring 5.

I have illustrated and described my improvements in an embodiment which is very practical. I have not attempted to illustrate or describe other embodiments or adaptations as it is believed that this disclosure will enable those skilled in the art to embody or adapt my improvements as may be desired.

Having thus described my invention, what I claim as new and desire to secure by Letters Patent, is:

1. A preassembled composite piston ring for internal combustion engines, comprising a carrier member of channel section having parallel flanges, the web thereof having tongues struck outwardly therefrom and a plurality of circumferentially spaced openings, said tongues being spaced axially a predetermined distance from both said flanges, cylinder wall engaging elements disposed in the axial spaces between said tongues and flanges and maintained in parallel axially spaced relation thereby, and an expanding spring rove through the circumferentially spaced openings in said web, said spring having rounded crimps engageable with the inner edges of said segments and connecting reaches engageable with the bottom of a piston ring groove whereby to exert radial expansive action on said segments.

2. In a composite piston ring, the combination of a carrier member of channel section having flanges and of ductile metal, the web of the carrier member having tongues struck outwardly therefrom and lying between the flanges with their edges in spaced relation thereto and coaction therewith to provide cylinder wall engaging element receiving recesses, there being relatively narrow portions of the web between each pair of tongues, split cylinder wall engaging elements of wear resisting material disposed in said recesses, and a crimped expander spring rove through the openings in said carrier web resulting from striking the said tongues therefrom for coaction with said cylinder wall engaging elements.

3. In a composite piston ring, the combination of a carrier member of channel section having flanges and of ductile metal, the web of the carrier member having oppositely disposed pairs of angled tongues struck outwardly therefrom and lying between the flanges with their edges in spaced relation thereto and coaction therewith to provide cylinder wall element receiving recesses, and split cylinder wall engaging elements of ribbon steel disposed in said recesses.

4. In a composite piston ring, the combination of a carrier member of channel section having flanges and of ductile metal, the web of the carrier member having tongues struck outwardly therefrom and lying between the flanges with their edges in spaced relation thereto and coacting therewith to provide cylinder wall element receiving recesses, and split cylinder wall engaging elements of ribbon steel disposed in said recesses.

5. A composite piston ring for internal combustion engines, comprising a carrier member of ductile metal provided with axially spaced radial portions adapted to be disposed parallel to the wall of a piston ring groove, said member having a plurality of circumferentially spaced elements extending radially between said portions, cylinder wall engaging segments disposed in the axial spaces between said elements and portions and maintained in axially spaced parallel relation thereby, and an inner expanding spring having portions engageable with said segments and further support engaging portions.

6. In a composite piston ring, the combination of a carrier member of channel section having flanges and pairs of tongues projecting outwardly from the web thereof and lying between the flanges with their edges in spaced relation thereto and coacting therewith to provide cylinder wall engaging element receiving recesses, the web of said carrier member having spaced openings therein, thin split cylinder wall engaging elements disposed in said recesses, and a crimped expander spring rove through said openings in said carrier web for coaction with said cylinder wall engaging elements.

7. In a composite piston ring, the combination of a carrier member of channel section having flanges and pairs of tongues projecting outwardly from the web thereof and lying between the flanges with their edges in spaced relation thereto and coacting therewith to provide cylinder wall engaging element receiving recesses, and thin split cylinder wall engaging elements disposed in said recesses.

8. A composite piston ring unit comprising a carrier element having annular radially directed flanges, a pair of annular split cylinder wall engaging segments disposed between said flanges, said carrier element having tongues struck outwardly therefrom and disposed between said segments in axial supporting engagement therewith to maintain the segments in parallel axially spaced relation, and an expanding spring associated with said carrier element having portions disposed between said flanges in thrust engagement with said segments, said expanding spring being rove through the spaces defined by the offsetting of the tongues to render said assembly a unitary one.

9. A composite piston ring unit comprising a carrier element having annular radially directed flanges and spaced openings therebetween, an annular split cylinder wall engaging segment disposed between said flanges, and an expanding spring associated with said carrier element having portions disposed between said flanges in thrust engagement with said segment and further portions disposed to the rear of the carrier element, said expanding spring being rove through the spaced openings in said carrier element between said flanges to render said assembly a unitary one.

10. A composite piston ring unit comprising a carrier element having radially directed portions, a pair of annular split cylinder wall engaging segments associated with said element and restrainingly engaged by said portions, said carrier element having tongues struck outwardly therefrom and disposed between said segments in supporting engagement therewith to maintain the segments in parallel axially spaced relation, and an expanding spring associated with said carrier element having portions in thrust engagement with said segments and further portions disposed to the rear of the carrier element, said carrier element having openings formed in the web thereof of greater axial width than the spaces defined by the offsetting of the tongues, said expanding spring being rove through said openings to render said assembly a unitary one.

11. A composite piston ring unit comprising a carrier element having radially directed portions, a pair of annular split cylinder wall engaging segments associated with said element and restrainingly engaged by said portions, said carrier element having tongues struck outwardly therefrom and disposed between said segments in supporting engagement therewith to maintain the segments in parallel axially spaced relation, and an annular split expanding spring associated with said carrier element having portions in thrust engagement with said segments and further portions disposed to the rear of the carrier element.

12. A composite piston ring unit adapted to be mounted in a piston groove comprising a carrier element having radially directed portions, a pair of annular split cylinder wall engaging segments associated with said element between and restrainingly engaged by said portions, spacer means for maintaining said segments in axially spaced relation between said portions, and a plurality of expanding spring segments associated with said carrier element having portions in thrust engagement with said segments at points to the rear of said spacer means and further portions disposed to the rear of the carrier element for radial thrust engagement with the bottom of a piston ring groove receiving said unit.

13. A composite piston ring unit comprising a carrier element having radially directed portions, a pair of annular split cylinder wall engaging segments associated with said element and restrainingly engaged by said portions, said carrier element having tongues struck outwardly therefrom and disposed between said segments in supporting engagement therewith to maintain the segments in parallel axially spaced relation.

14. In a composite piston ring assembly, a carrier member having an axial wall portion, a plurality of cylinder wall engaging elements carried thereby, said member having means for maintaining said elements in axially spaced parallel relation, and an expanding spring associated with said carrier member having portions disposed radially outwardly of said wall portion to exert radial outward thrust on said elements at points to the rear of said means, said carrier member and expanding spring having interlocking engagement with one another preventing separation thereof for maintaining the same in predetermined unitary form.

15. In a composite piston ring assembly adapted to be mounted in a piston groove, an annular carrier member having an axial wall, a cylinder wall engaging element carried thereby, and an expanding spring associated with said carrier member having portions disposed radially externally of said wall for thrust engagement with the rear of said element and further portions disposed radially inwardly of said wall for engagement with the bottom of said groove to exert radial outward thrust on said element, said carrier member having openings in said wall and said expanding spring being rove through said openings whereby the member and spring are retained in assembled relation.

16. In a composite piston ring assembly, a carrier member, and a plurality of cylinder wall engaging elements associated therewith, said member having means integral therewith for maintaining said elements in axially spaced relation including a radially extending flange and a plurality of integral radially extending tongues spaced axially from said flange, one of said elements being disposed between said tongues and flange and the other element engaging the opposite side of said tongues.

HAROLD P. PHILLIPS.